United States Patent [19]
Kawasaki

[11] Patent Number: 5,501,407
[45] Date of Patent: Mar. 26, 1996

[54] PHOTO FILM CASSETTE HAVING LIGHT TRAPPING RIBBONS IN WHICH PILE THREADS ARE SECURELY HELD IN PLACE AND METHOD OF MANUFACTURING THE RIBBONS

[75] Inventor: Hidetoshi Kawasaki, Minami-Ashigara, Japan

[73] Assignee: Fuji Photo Film Co., Ltd., Kanagawa, Japan

[21] Appl. No.: 225,988

[22] Filed: Apr. 12, 1994

[30] Foreign Application Priority Data

Apr. 12, 1993 [JP] Japan .................. 5-084911

[51] Int. Cl.⁶ .................................................. G03B 17/26
[52] U.S. Cl. ........................ 242/348.4; 242/588.5
[58] Field of Search ................ 242/348.4; 354/275

[56] References Cited

U.S. PATENT DOCUMENTS

| | | |
|---|---|---|
| 4,834,306 | 5/1989 | Robertson et al. . |
| 4,846,418 | 7/1989 | Fairman . |
| 4,928,826 | 5/1990 | Shibazaki et al. .............. 242/348.4 |
| 5,205,506 | 4/1993 | Mizuno et al. .................. 242/348.4 |
| 5,206,676 | 4/1993 | Mizuno et al. .................. 242/348.4 |
| 5,213,277 | 5/1933 | Takahashi et al. .............. 242/348.4 X |
| 5,217,179 | 6/1993 | Sugiyama ...................... 242/348.4 |
| 5,223,876 | 6/1993 | Komatsuzaki .................. 242/348.4 X |
| 5,234,176 | 8/1993 | Mizuno .......................... 242/348.4 |
| 5,275,283 | 1/1994 | Akao ............................... 206/409 |
| 5,308,009 | 5/1994 | Mizuno .......................... 242/348.4 |
| 5,332,168 | 7/1994 | Shibata et al. ................. 242/348.4 X |
| 5,381,980 | 1/1995 | Enomoto ........................ 242/348.4 |

FOREIGN PATENT DOCUMENTS

| | | |
|---|---|---|
| 62-27733 | 2/1987 | Japan . |
| 62-55649 | 3/1987 | Japan . |
| 62-71949 | 4/1987 | Japan . |
| 215254 | 1/1990 | Japan . |
| 272348 | 3/1990 | Japan . |

*Primary Examiner*—Daniel P. Stodola
*Assistant Examiner*—Emmanuel M. Marcelo
*Attorney, Agent, or Firm*—Sughrue, Mion, Zinn, Macpeak & Seas

[57] ABSTRACT

A photo film cassette has a spool on which photo film is wound. A cassette shell contains the spool in rotatable fashion. A pair of light-trapping ribbons are respectively mounted inside a photo film passage port in the cassette shell, and prevents ambient light from entering the cassette shell through the passage port. The ribbons are constituted of warp pile fabric woven in a needle loom from warp threads, weft threads, and warp pile threads. A first one of the weft threads is passed under a first one of the warp threads, then passed over a first one of the warp pile threads, and subsequently passed under a second one of the warp threads. The pile fabric is woven so as to symmetrize the first and second warp threads relative to the first warp pile thread. It follows that the ribbons are woven to have the firmly retained warp pile threads that are difficult to drop away from the ribbons.

19 Claims, 6 Drawing Sheets

PHOTO FILM CASSETTE HAVING LIGHT TRAPPING RIBBONS IN WHICH PILE THREADS ARE SECURELY HELD IN PLACE AND METHOD OF MANUFACTURING THE RIBBONS

BACKGROUND OF THE INVENTION

1. Field of the Invention

The present invention relates to a photo film cassette. More particularly the present invention relates to an improvement of light-trapping ribbons disposed in a photo film cassette.

2. Description of the Related Art

A known photo film cassette has a cassette shell, a rotatable spool, and photo film wound on the spool and contained in the cassette shell. A passage port is formed in the cassette shell. The passage port communicates to the exterior of the cassette, and allows the photo film to pass into and out of the cassette shell. Light-trapping ribbons are disposed inside the passage port for preventing ambient light from entering the cassette shell and thus preventing the photo film from being exposed or fogged.

The known light-trapping ribbons are made of a soft and flexible material to protect surfaces of the photo film from being scratched during passage through the passage port. An example of such ribbons are pile woven fabrics, constituted of a base fabric and pile threads rooted therein. An example of weave of such a pile woven fabric is disclosed in JP-A (Japanese Patent Laid-open Publication No. 2-15254). One warp pile thread of this ribbon is passed under one weft thread, and retained on the warp pile woven fabric. Beside the warp pile thread, first and second warp threads are arranged in parallel and contact the pile thread. Structurally, one weft thread is passed over the first warp thread, and then passed over the warp pile thread, before being passed over the second warp thread.

However, the retention of the warp pile thread on the above-mentioned fabric is somewhat weak. The warp pile thread passes under the weft thread in a fashion common to either of the adjacent warp threads, and is likely to be moved by incidentally applied force. When a needle loom is used for weaving the warp pile woven fabric, warp pile threads are often accidentally placed on the base of an improper position. A position where a pile thread is missed, i.e., not present, will have a hole. Holes can cause failure of the light trapping characteristics of the pile woven fabric.

It is also known to apply a filler agent to a bottom face of the pile woven fabric to prevent bottom portions of the pile threads from dropping away from the base fabric. It is conceivable to use a filler having a high wettability, i.e., a characteristic of easily permeating into the fabric, for the purpose of ensuring adhesion of the filler to the fabric, especially in fabrics where the bottom of the pile threads does not project from, but is flush with, the bottom of the base fabric.

However, there are disadvantages associated with the use of such a filler, because the filler applied to the bottom face permeates into top portion of the pile threads, and hardens the pile threads which contact with the photo film. The surfaces of the photo film thus tend to be scratched by the hardened pile threads of the ribbons during passage through the passage port.

U.S. Pat. No. 4,634,306 and U.S. Pat. No. 4,846,418 disclose a leader-advancing photo film cassette, in which a leader of the photo film is entirely pre-contained in a cassette shell, and when a spool is rotated, the leader is advanced to the outside of the cassette shell. It is conceivable to provide the leader-advancing cassette with light-trapping ribbons. However, conventional light-trapping ribbons have pile bottoms flush with a bottom face. Therefore, the filler hardens pile threads until the pile threads become resistant to the movement of the photo film. The leader of the photo film is thus hindered from advancing through the passage port. Also, the film is likely to be scratched.

SUMMARY OF THE INVENTION

In view of the foregoing problems, an object of the present invention is to provide a photo film cassette having a passage port in which pile threads are firmly retained on light-trapping ribbons.

Another object of the present invention is to provide a photo film cassette of which pile threads of light-trapping ribbons can be kept in a flexible condition without being hardened or stiffened.

Still another object of the present invention is to provide a leader-advancing photo film cassette having light-trapping ribbons suitable for a leader-advancing structure of the cassette.

In order to achieve the above and other objects and advantages of this invention, light-trapping ribbons are constituted of a warp pile woven fabric woven in a needle loom from warp threads, weft threads, and warp pile threads. A first one of the weft threads is passed under a first one of the warp threads, then passed over a first one of the warp pile threads, and subsequently passed under a second one of the warp threads. The pile fabric is woven to render the first and second warp threads symmetric relative to the first warp pile thread.

The warp pile threads are firmly retained on the light-trapping ribbons and are thus resistant to applied force. The needle loom, for weaving the warp pile woven fabric, reliably places the warp pile threads in the proper position in the base fabric. No holes are formed in the pile woven fabric and thus the ribbons will reliably trap ambient light.

In a preferred embodiment, the ribbons include a selvedge portion formed along at least one of two lateral edges of the pile fabric. The selvedge portion is woven according to a plain weave from additional warp threads and the weft threads.

It is possible, in adhesion of the ribbons to the cassette shell, to press the ribbons against the cassette shell without pressing or damaging the warp pile threads, because the ribbons can be pressed at the selvedge portion.

Preferably, rotation of the spool in an unwinding direction causes a leader of the photo film responsively to advance externally through the passage port between the ribbons.

The light-trapping ribbons in the present invention are suitable for a cassette with a leader-advancing structure, in which the leader of the photo film is entirely pre-contained in the cassette shell. When the spool is rotated, the warp pile threads of the light-trapping ribbons never hinder the leader of the photo film from advancing, and allow the leader to reliably advance out through the passage port in response to the rotation of the spool.

Further, filler is applied to a bottom face of the ribbons. The ribbons include second weft threads arranged adjacently to the first weft threads. The second weft thread is passed over to the first warp thread, then passed beside the first warp pile thread, and subsequently passed over the second warp thread.

In the present invention, the bottoms of the warp pile threads are not flush with, but project from, the bottom face of the fabric. It follows that even a filler having a low wettability can be used to reliably anchor the bottom face of the pile woven fabric. Such a filler applied to the bottom face never permeates up to tops of the warp pile threads. The warp pile threads can thus remain flexible without being hardened or stiffened, and scratching of the surfaces of the photo film is avoided.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS OF THE PRESENT INVENTION

Figure 1:
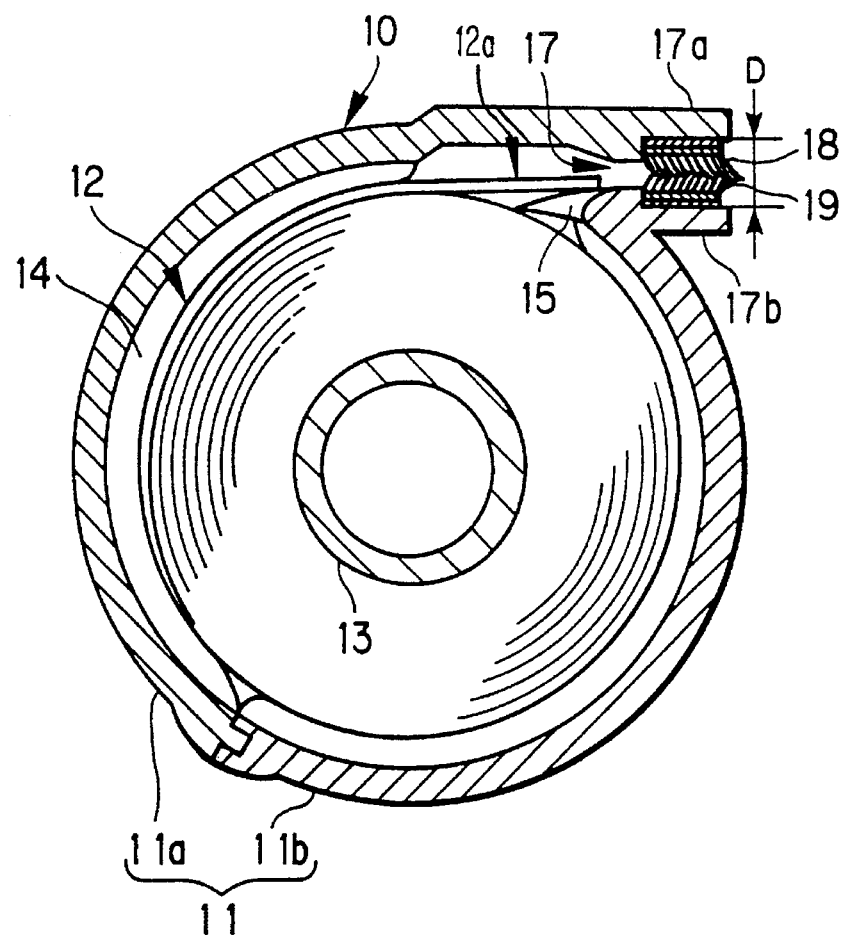
FIG. 1 is a photo film cassette of the preferred embodiment of the present invention in section.

In FIG. 1 illustrating a photo film cassette 10, a cassette shell 1 is constituted of two shell halves 11a and 11b, which are welded together in light-tight fashion, by ultrasonic welding or the like. The cassette shell 11 contains a rotatable spool 13 and photo film 12 wound on the spool 13 as a roll. The photo film 12 is for example Fuji Color Super HG 400 (trade name; manufactured by Fuji Photo Film Co., Ltd.).

The cassette shell 11 is formed from plastics and colored to be opaque enough to provide light-tightness. For example, the cassette shell 11 can be formed of high-impact polystyrene (HIPS) with carbon black added thereto at 0.5%. The inside of the cassette shell 11 is provided with two pairs of arcuate ridges 14, which prevent the roll of the photo film 12 from loosening, and reduce friction between the photo film 12 and the inside of the cassette shell 11. A reference numeral 15 designates a separator claw. When the spool 13 is rotated in an unwinding direction, a leader 12a of the photo film 12 abuts the separator claw 15, which separates the leader 12a from the roll of the photo film 12 to advance the leader 12a to the outside of the cassette shell 11 through a passage port 17.

The passage port 17 is formed in the cassette shell 11 for allowing the photo film 12 to exit from the cassette shell 11. The passage port 17 is defined between two port walls 17a and 17b. The port walls 17a and 17b are provided with respective light-trapping ribbons 18 and 19, which prevent ambient light from entering the cassette shell 11 and fogging the photo film 12. An interval D between the port walls 17a and 17b is determined to be 2.3 mm.

Figure 2:
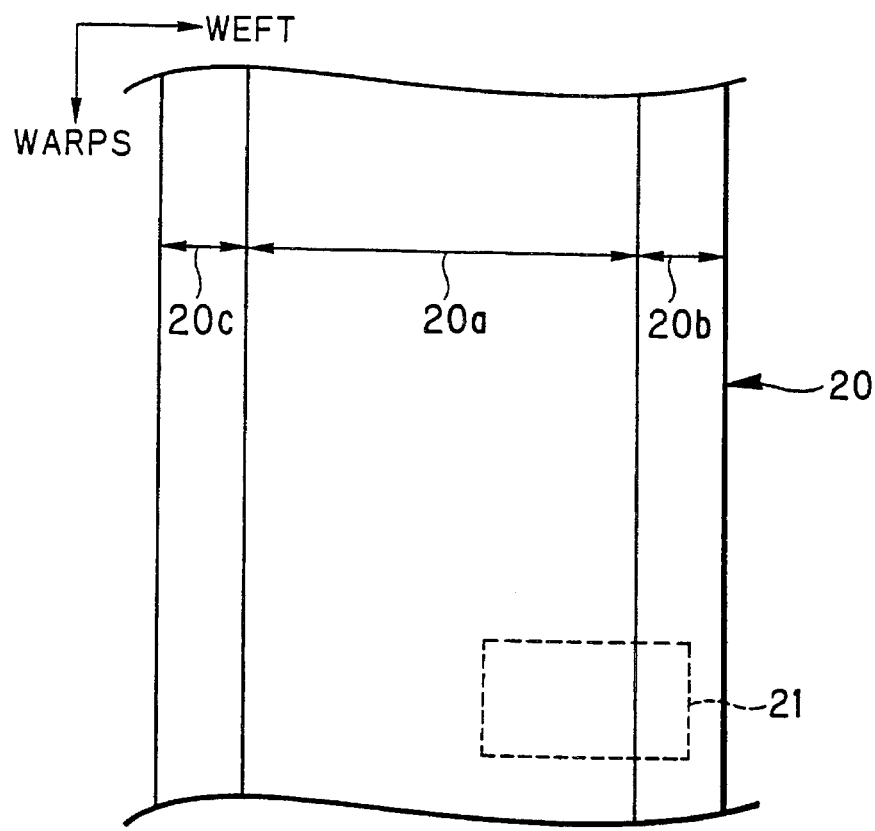
FIG. 2 is a plan view partially illustrating a woven fabric for use as light-trapping ribbons in the cassette illustrated in FIG. 1.

As illustrated in FIG. 2, the light-trapping ribbons 18 and 19 are formed of woven fabric 20 having a small width. The woven fabric 20 is constituted of a pile fabric portion 20a and two pileless selvedges 20b and 20c. A region 21 as indicated by the broken line in FIG. 2 is woven in the manner illustrated in FIG. 3.

Figure 3:
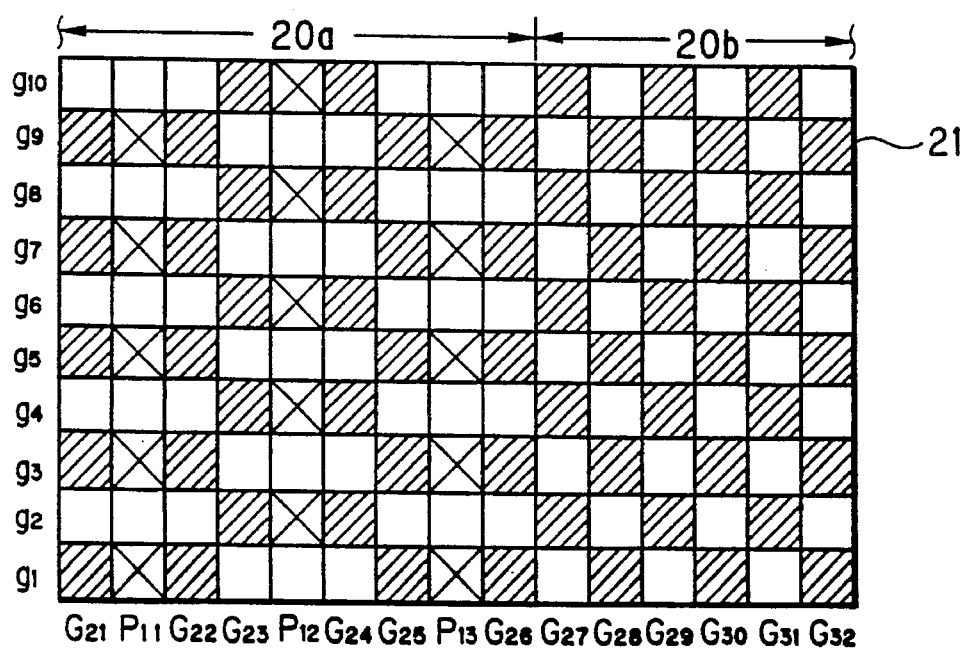
FIG. 3 is a schematic diagram illustrating a weave of the woven fabric illustrated in FIG. 2.

In FIG. 3, elementary columns separated by the vertical lines designate respective wrap threads G21 to G32 and warp pile threads P11 to P13. Elementary rows separated by the horizontal lines designate respective weft threads g1 to g10. Hatched squares designate an intersection where a warp thread passes over the weft thread. Squares indicated with an X designate an intersection where a warp pile thread passes under the weft thread and is retained on the pile fabric portion 20a.

Figure 4:
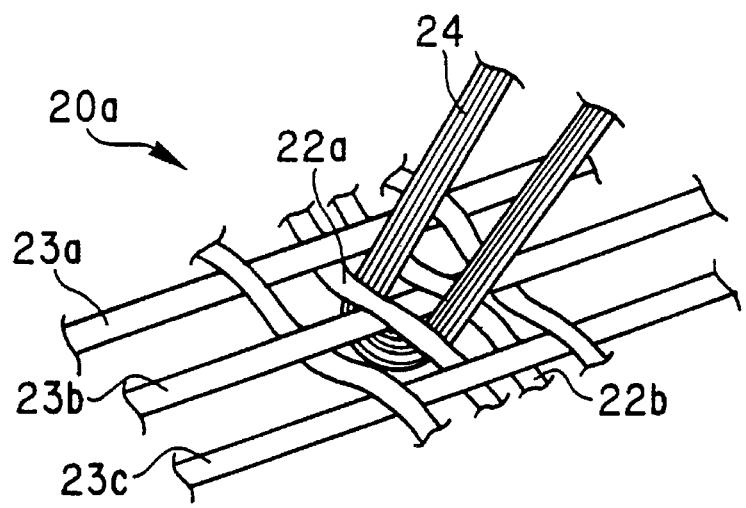
FIG. 4 is an explanatory view in perspective, illustrating the weave illustrated in FIG. 3.
Figure 5:
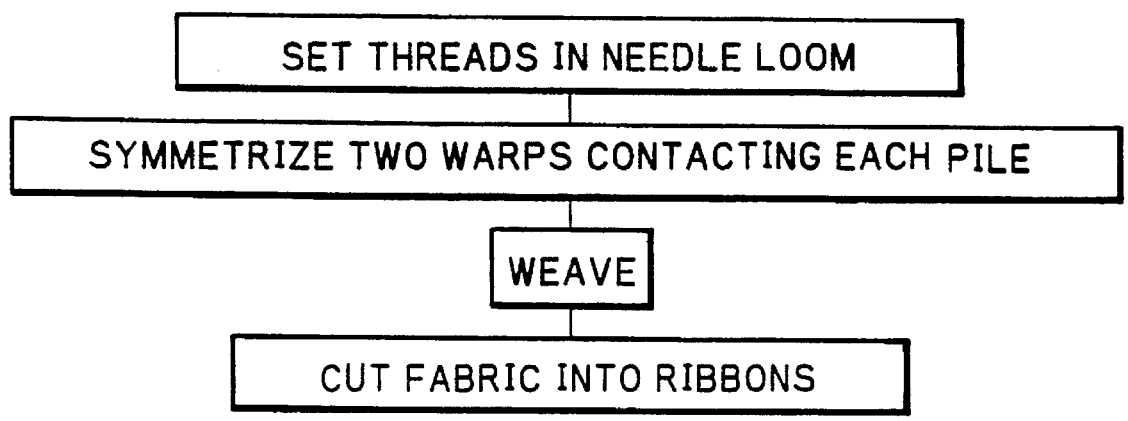
FIG. 5 is a flow chart illustrating a process of manufacturing the ribbons.

As illustrated in FIG. 4, one of the warp threads 22a, i.e., G23 in FIG. 3 for example, is arranged in contact along a pile thread 24, i.e. P12, which in turn is arranged in contact along a warp thread 22b, i.e., G24. The pile fabric portion 20a is characterized in that the warp thread 22a or G23 is woven in symmetry with the warp thread 22b or G24 in relation to the pile thread 24 or P12, as is also depicted in FIG. 5. The pile fabric portion 20a is also characterized in that one of the weft threads 23b or g2 passes under the warp thread 22a or G23, and then passes over the pile thread 24 or P12, before passing under the warp thread 22b or G24. The weft thread 23b or g2 is arranged in contact between two weft threads 23a or g3, and 23c or g1, either of which passes over the warp thread 22a or G23, and then passes under the pile thread 24 or P12, before passing over the warp thread 22b or G24. As all the threads are tightly woven together as fabric, the pile thread 24 or P12 is squeezed tightly between the two adjacent warp threads 22a and 22b, i.e., G23 and G24, as well as squeezed between the three adjacent weft threads 23a to 23c, i.e., g1 to g3.

The pile fabric portion 20a thus woven, the pile thread 24 is secured fixedly on a base fabric of the fabric portion 20a, and will not drop away from the base fabric. The portion of the light-trapping ribbons 18 and 19 at or near a root of the pile thread 24 can have sufficient light-trapping characteristics, and thus the photo film 12 will not be fogged. Note that the pile fabric portion 20a is characterized as woven in the fashion of a "weft rib weave", in which hatchened squares in FIG. 3 are aligned in the weft direction to form ribs and each weft thread having a rib is alternated with a ribless weft thread.

It is also noted that the woven fabric 20 is 4.0 mm wide according to the above embodiment, but can have a width from 2.0 mm to 12.0 mm. It is desirable to form needle loops on one of the two selvedges 20b and 20c. A sum of widths of the selvedges 20b and 20c is in a range from 10 to 50% of the weaving width of the woven fabric 20. The width sum of the selvedges 20b and 20c is preferably in the range from 20 to 40% of the weaving width of the woven fabric 20.

The selvedge 20b can be used for being pressed in adhesion with adhesive agent attaching the ribbons 18 and 19 on the port walls 17a, 17b, without pressing or damaging the pile threads 24.

Figure 2A:
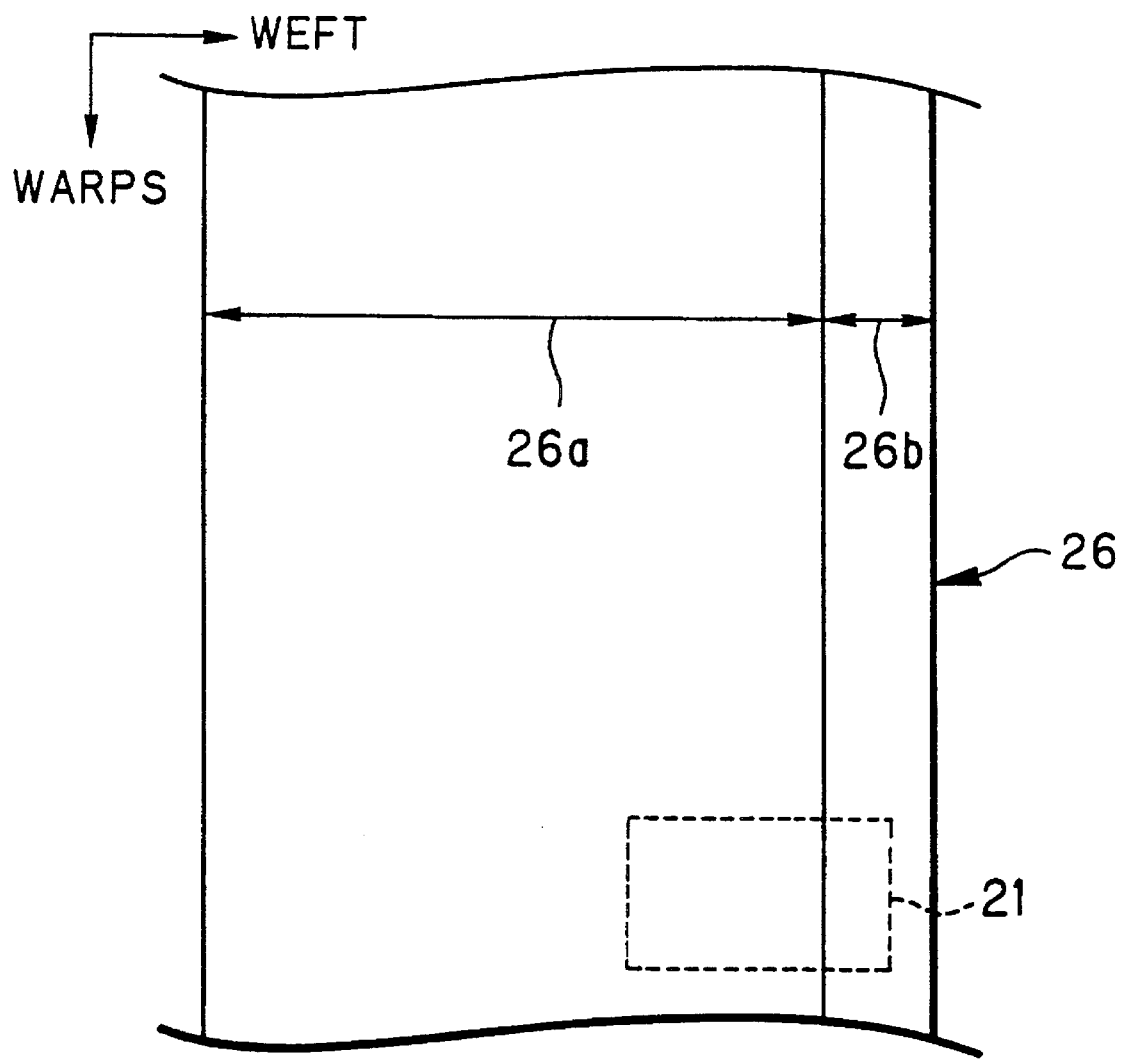
FIG. 2A is a plan view partially illustrating a variant woven fabric having a single pileless selvedge.

In the above embodiment, the selvedges 20b and 20c without pile threads 24 are formed on both edges of the pile fabric portion 20a. Alternatively, only one pileless selvedge 26b may be formed on either edge of a pile fabric portion 26a of woven fabric 26 as illustrated in FIG. 2A. The opposite edge of the pile fabric portion 26a may be generally associated with the pile threads 24. It is desirable to form needle loops on one of the two edges of the woven fabric 26. The selvedge 26b has a width in a range from 10 to 50% of the weaving width of the woven fabric 26. The width of the selvedge 26b is preferably in the range from 20 to 40% of the weaving width of the woven fabric 26.

For the base fabric and the pile threads 24 of the ribbons 18, 19, it is preferable to use synthetic fiber made of thermoplastic resin, e.g., polyamide types such as nylon 6, nylon 6/6 or nylon 12; polyolefin types such as polyethylene, polypropylene, vinyl chloride or polystyrene; polyester types such as polyethylene terephthalate or polybutylene phthalate; polyvinyl alcohol types; polyvinylidene chloride types; polyvinyl chloride types; polyacrylonitrile types; polyvinylidene cyanide types; polyfluoroethylene types; and polyurethane types. More than one thermoplastic resin selected from the above may be mixed. It is desirable to use thermoplastic resin having formability of fibers.

For destaticization, an antistatic compound and/or a conductive substance can be added to the thermoplastic resin by means of mixture, adsorption or build-up as is well known. Also, an antistatic compound can be copolymerized with the thermoplastic resin. Such an antistatic compound can be selected from alkyl ether ester types and alkyl ether types, and/or hydrophilic and surface-active compounds. As a conductive substance, conductive carbon black, metal, conductive metallic oxides, conductive metallic compounds, or grains having a membrane of such, can be used.

It is desirable to select a filler from among such disclosed in U.S. Pat. No. 5,275,283 (corresponding to JP-A 63-49756) and JP-A 62-27733, 62-55649, 62-71949 and 2-72348: polyvinyl type synthetic resin emulsion, polyolefin type synthetic resin emulsion, synthetic rubber type emulsion, polyamide type synthetic resin emulsion, thermoplastic polyurethane type synthetic resin emulsion, and thermoplastic polyester type synthetic resin emulsion. As the filler, one or more emulsions selected from the above can be used.

To attach the light-trapping ribbons 18, 19 to the cassette shell 11, an adhesive medium may be applied, such as: acrylic type double-sided adhesive tape (e.g., NP350B manufactured by Sony Chemicals Corporation); polyester type dielectric bonding adhesive agent (e.g., LIOHARD manufactured by Toyo Ink Mfg. Co., Ltd.); delayed-tack type adhesive agent (e.g., BPW-5249 manufactured by Toyo Ink Mfg. Co., Ltd.); α-cyano-acrylate type adhesive agent (e.g., ARON ALPHA 232 manufactured by Toagosei Chemical Industry Co., Ltd.); and acrylic type structural adhesive agent (e.g., 39X-069 manufactured by Three Bond Co., Ltd.). These adhesives can be used in addition to the fillers mentioned above.

The pile threads 24, if constituted of nylon PAREL threads having a circular cross section, can have a desirable thickness of 100 deniers or less. Should the thickness be larger than that, the rigidity of the pile threads 24 would be so large as to make it difficult to incline the pile threads 24. The desirable length of the pile threads 24 is equal to 1 mm or more and at most the width of the ribbons 18, 19. Should the width be less than 1 mm, it would be difficult to incline the pile threads 24. Should it be larger than the width of the ribbons 18, 19, the ribbons 18, 19 would be difficult to handle. The cross section of the pile threads 24 may have an elliptical shape, or any other shape that is advantageous for the light-trapping ability.

Each pile thread may have any desired number of filaments. The density of the pile threads 24 is preferably from 20,000 to 100,000 threads/cm$^2$ and more desirably from 25,000 to 70,000 threads/cm$^2$. Should the density be larger than the upper limit, the pile threads 24 may interfere with each other, which would make it difficult to incline the pile threads 24. Further, the torque required for advancing the leader 12a would be excessively high. Should the density be smaller than the lower limit, the pile threads 24 may exhibit low light-trapping characteristics.

EXAMPLES

Several examples and comparable examples will be discussed below to explain the present invention in greater detail.

Example 1

The fabric 20 was constructed as follows:

warp threads 22: antistatic nylon PAREL threads, having 50 deniers and 10 filaments, and manufactured by Toray Industries, Inc.

weft thread 23: antistatic nylon PAREL thread, having 70 deniers and 24 filaments, and manufactured by Toray Industries, Inc.

warp pile threads 24: PROMILAN T 8100 nylon threads (trade name), having 100 deniers and 48 filaments, and manufactured by Toray Industries, Inc.

The warp threads 22, the weft thread 23 and the pile threads 24 were dyed black with Mitsui nylon black SGL at 6% O.W.F. (of the weight of the fiber) by a wince dying machine, before being woven up into the fabric 20:

loom: needle loom width of the fabric 20: 4.0 mm width of the pile fabric portion 20a: 3.2 mm warp arranging density: 220 threads/inch weft inserting density: 85 threads/inch weave: structured according to FIG. 3 pile density: 68,000 threads/cm$^2$

The woven fabric 20 was sheared by a shearing machine to give a height of 2.0 mm to the pile threads 24. Before and after the shearing, the bottom face of the fabric 20 was pressed against thermal drums for the purpose of reducing a degree of projecting the bottoms of the pile threads 24 from the bottom face. Subsequently, the filler was applied on the bottom face of the woven fabric 20 for avoidance of dropping of the pile threads 24. The fabric 20 was cut into the ribbons 18, 19 at the length of a range of the passage port 16 as transverse to movement of the photo film 12. The ribbons 18, 19 were adhered to the port walls 17a, 17b by applying semi-tacky hot-melt adhesive agent.

Example 2

Figure 6:
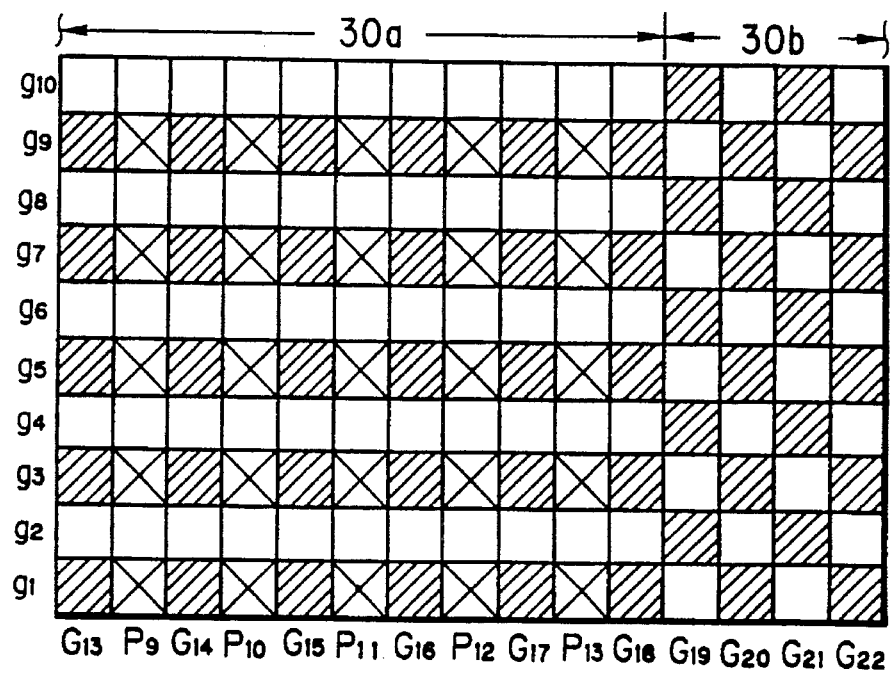
FIG. 6 is a schematic diagram illustrating another preferred weave of woven fabric.

The fabric was woven in a structure according to FIG. 6. The remaining conditions were all the same as Example 1. Reference numerals 30a represents a pile fabric portion, and 30b a pileless selvedge.

Comparative Example 1

Figure 7:
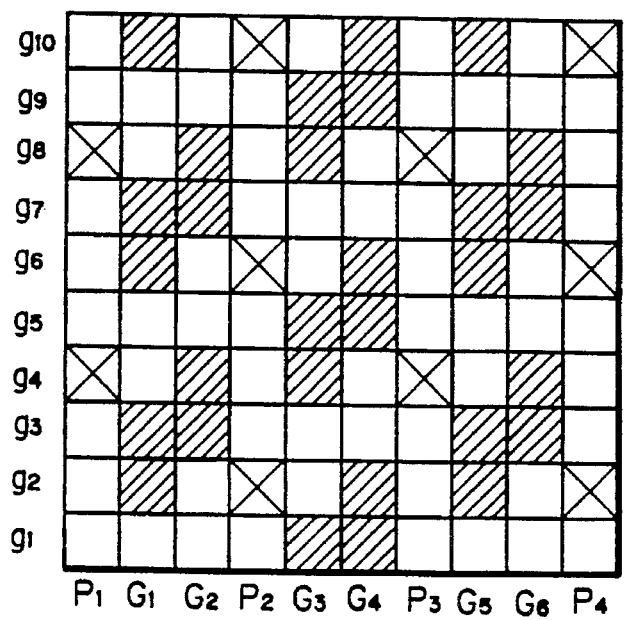
FIGS. 7 to 9 are schematic diagrams illustrating weaves of comparable examples as contrasted with the present invention.

The fabric was woven only as pile fabric portion in a structure according to FIG. 7, and lacked pileless selvedge 20b, 20c, or 30b. The remaining conditions were all the same as Examples 1 and 2.

Comparative Examples 2 and 3

Figure 8:
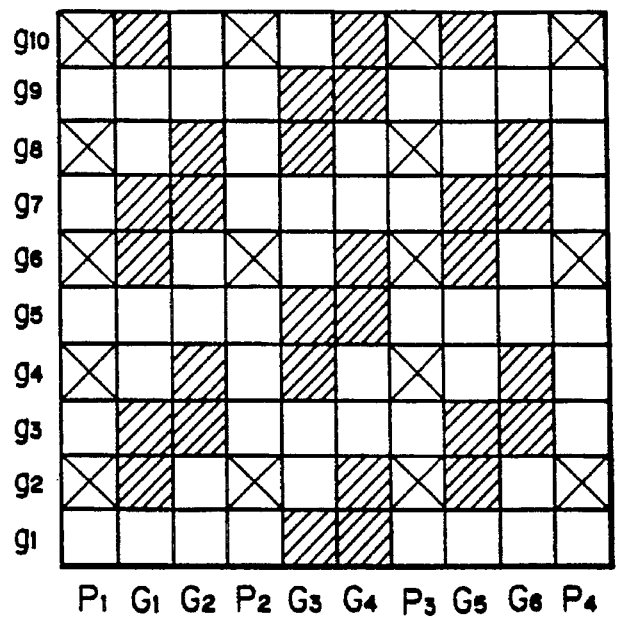
Figure 9:
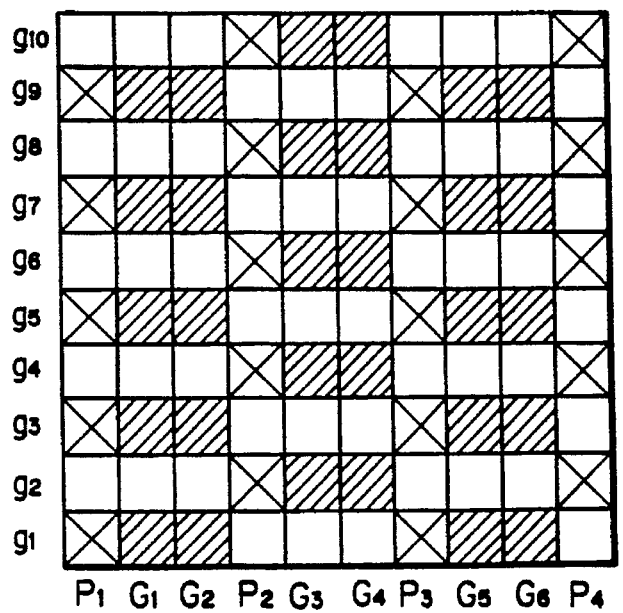

The fabric was woven only as pile fabric portion in a respective structure according to FIGS. 8 and 9. The remaining conditions were all the same as Comparative Example 1.

All of the above examples were inspected: a torque was applied to the spool 13 and measured by a torquemeter; whether the photo film 12 was fogged was checked; and whether the filler permeated even into the top of the pile threads 24 was also checked. Results are listed in Table 1 below.

TABLE

|  | Examples | | Comparable Examples | | |
| --- | --- | --- | --- | --- | --- |
|  | 1 | 2 | 1 | 2 | 3 |
| Advancing torque (g · cm) | 165 Good | 172 Good | 160 Good | 238 Nearly No Good | 220 Nearly No Good |
| Light-trapping performance | 0 Good | 0 Good | 5 No Good | 0 Good | 2 No Good |
| Permeation of filler into pile tops | None Good | None Good | Permeated No Good | Permeated No Good | Permeated No Good |
| Weaving structure | FIG. 3 | FIG. 6 | FIG. 7 | FIG. 8 | FIG. 9 |
| Total evaluation | Good | Good | No Good | No Good | No Good |

The following definitions apply to the terms used in the Table:

Advancing torque: The averaged value of the maximum torques applied to the spools of 30 photo film cassettes, in the course of advancing the leader 12a out of the cassette sell 11 through the passage port 17.

Light-trapping performance: The number of photo film cassettes in which the photo film 12 was fogged, among the 30 photo film cassettes, having been left to stand under light for a given duration of time.

Permeation of the filler into pile tops: In the woven fabric 20 being 100 meters long, the visually recognized status of whether the filler permeated into the tops of the pile threads 24.

As is apparent in Table, both Examples 1 and 2 exhibited a high quality in all evaluating parameters; the advancing torque, the light-trapping performance, and the permeation of the filler into the pile tops.

With Comparative Example 1, there were 5 (five) photo film cassettes in which the photo film 12 was fogged, among the 30 cassettes. The advancing torque was also high. Thus, Comparative Example 1 was inferior, although it did not exhibit permeation of the filler into the pile tops.

Comparative Example 2 was inferior, because it had a low quality in all the evaluating parameters, except for the light-trapping performance. Comparative Example 3 was inferior, because it had a low quality in all the evaluating parameters.

Although the present invention has been fully described by way of the preferred embodiments thereof with reference to the accompanying drawings, various changes and modifications will be apparent to those having skill in the art without departing from the scope of the present invention as defined by the appended claims.

What is claimed is:

1. A photo film cassette having a spool on which photo film is wound, a cassette shell for containing said spool in a rotatable fashion, said photo film cassette comprising:

a pair of light-trapping ribbons, respectively mounted on walls of a passage port formed in said cassette shell, for preventing ambient light from entering said cassette shell through said passage port, said ribbons constituted of warp pile woven fabric woven in a needle loom from warp threads, weft threads, and warp pile threads;

a first one of said weft threads being passed under a first one of said warp threads, then passed over a first one of said warp pile threads, and subsequently passed under a second one of said warp threads; and said pile fabric woven so as to render said first and second warp threads symmetric with one another relative to said first warp pile thread.

2. A photo film cassette as defined in claim 1, wherein said cassette shell is constituted of a pair of shell halves.

3. A photo film cassette as defined in claim 2, wherein rotation of said spool in an unwinding direction causes a leader of said photo film to advance externally through said passage port between said ribbons.

4. A photo film cassette as defined in claim 3, wherein said ribbons include a selvedge portion formed along at least one of two lateral edges of said pile fabric, and said selvedge portion is woven according to a plain weave from additional warp threads and said weft threads.

5. A photo film cassette as defined in claim 4, wherein said ribbons include a second one of said weft threads arranged adjacent to said first weft thread, and said second weft thread is passed over said first warp thread, then passed beside said first warp pile thread, and subsequently passed over said second warp thread.

6. A photo film cassette as defined in claim 5, wherein said ribbons have a weaving width which corresponds to a depth of said passage port.

7. A photo film cassette as defined in claim 6, wherein a filler is applied to a bottom face of said ribbons.

8. A photo film cassette as defined in claim 7, wherein said warp pile threads are black, have a length greater than a half of an interval defined between said walls of said passage port, and are inclined inside said passage port toward an outside of said cassette shell.

9. A photo film cassette as defined in claim 8, wherein said second warp thread contact a third one of said warp threads, which contacts a second one of said warp pile threads, which contacts a fourth one of said warp threads.

10. A photo film cassette as defined in claim 8, wherein said warp pile threads are alternated with said warp threads.

11. A photo film cassette as defined in claim 8, wherein:

said warp threads, said weft threads and said warp pile threads are synthetic fiber made of thermoplastic resin; and said thermoplastic resin is selected from at least one of nylon 6, nylon 6/6, nylon 12, polyethylene, polypropylene, polypropylene, vinyl chloride, polystyrene, polyethylene terephthalate, polybutylene phthalate, polyvinyl alcohol types, polyvinylidene chloride types, polyvinyl chloride types, polyacrylonitrile types, polyvinylidene cyanide types, polyfluoroethylene types, and polyurethane types.

12. A photo film cassette as defined in claim 8, wherein:

said warp threads, said weft threads and said warp pile threads have at least one of an antistatic compound and a conductive substance incorporated therein;

said antistatic compound is selected from at least one of alkyl ether ester types, alkyl ether types, and hydrophilic and surface-active compounds;

said conductive substance is selected from one of conductive carbon black, metal, conductive metallic oxides, conductive metallic compounds, and grains having a membrane thereof;

said filler is an emulsion selected from at least one of polyvinyl type synthetic resin, polyolefin type synthetic resin, synthetic rubber types, polyamide type synthetic resin, thermoplastic polyurethane type synthetic resin, and thermoplastic polyester type synthetic resin;

said bottom face of said ribbons is adhered to said walls of passage port with an adhesive; and said adhesive is selected from one of a semi-tacky hot-melt adhesive agent, acrylic type double-sided adhesive tape, polyester type dielectric bonding adhesive agent, delayed-tack type adhesive agent, α-cyano-acrylate type adhesive agent, and acrylic type structural adhesive agent.

13. A photo film cassette as defined in claim 8, wherein said weaving width of said ribbons is in the range of 2.0 mm to 12.0 mm, said warp pile threads are rooted at a density in the range of 20,000 to 100,000 threads/cm$^2$ in said pile fabric, the length of said warp pile threads is in the range of 1 mm to said width of said ribbons, and said selvedge is woven at a width in the range of 10% to 50% of said weaving width of said ribbons.

14. A method of manufacturing a photo film cassette having a spool on which photo film is wound, a cassette shell for containing said spool in a rotatable fashion, and a pair of light-trapping ribbons respectively mounted on walls of a passage port formed in said cassette shell for preventing ambient light from entering said cassette shell through said passage port, said method comprising steps of:

setting warp threads, weft threads, and warp pile threads in a needle loom;

passing a first one of said weft threads under a first one of said warp threads, then over a first one of said warp pile threads to root said first warp pile thread, and subsequently under a second one of said warp threads;

rendering said first and second warp threads symmetric with one another relative to said first warp pile thread, to weave warp pile woven fabric; and cutting said pile fabric into pieces to form said ribbons.

15. A cassette manufacturing method as defined in claim 14, further comprising the step of:

weaving additional warp threads and said weft threads into a plain weave to form a selvedge portion formed along at least one of two lateral edges of said pile fabric.

16. A cassette manufacturing method as defined in claim 15, wherein said ribbons include a second one of said weft threads arranged adjacently to said first weft thread, and said second weft thread is passed over said first warp thread, then passed beside said first warp pile thread, and subsequently passed over said second warp thread.

17. A cassette manufacturing method as defined in claim 16, wherein said ribbons are woven at a weaving width corresponding to a depth of said passage port.

18. A cassette manufacturing method as defined in claim 17, wherein said second warp thread contacts a third one of said warp threads, which contacts a second one of said warp pile threads, which contacts a fourth one of said warp threads.

19. A cassette manufacturing method as defined in claim 17, wherein said warp pile threads are alternated with said warp threads.

\* \* \* \* \*